United States Patent [19]

Stenström et al.

[11] Patent Number: 4,860,156
[45] Date of Patent: Aug. 22, 1989

[54] OVERVOLTAGE PROTECTIVE CIRCUIT

[75] Inventors: Lennart Stenström; Allan Akerstedt, both of Ludvika, Sweden

[73] Assignee: Asea Brown Boveri AB, Västerås, Sweden

[21] Appl. No.: 239,769

[22] Filed: Sep. 2, 1988

[30] Foreign Application Priority Data

Sep. 4, 1987 [SE] Sweden ............................ 8703441

[51] Int. Cl.$^4$ .................................................. H02H 1/04
[52] U.S. Cl. ........................................ 361/128; 361/8; 361/13; 361/16; 361/118; 361/127; 361/129; 361/130
[58] Field of Search ................... 361/8, 13, 15, 16, 17, 361/117, 118, 119, 126, 127, 128, 130, 131

[56] References Cited

U.S. PATENT DOCUMENTS

| | | |
|---|---|---|
| 2,862,152 | 11/1958 | Ryden ................... 361/16 |
| 4,198,668 | 4/1980 | Bergdahl et al. ........ 361/8 |
| 4,625,254 | 11/1986 | Fahlén .................. 361/16 |

FOREIGN PATENT DOCUMENTS 359509  7/1973  Sweden.

Primary Examiner—Derek S. Jennings
Attorney, Agent, or Firm—Watson, Cole Grindle & Watson

[57] ABSTRACT

A trigger circuit for a spark gap chain with at least two series-connected spark gaps, of which at least one is provided with at least one trigger electrode, includes a resistor chain which is connected in parallel with the spark gap chain and comprises at least two series-connected resistor groups. That of the resistor groups which is connected in parallel with the spark gap provided with a trigger electrode comprises a voltage-dependent resistor, built up of zinc oxide varistors, which is connected in series with a linear resistor. The voltage across the linear resistor is supplied to the trigger electrode of the spark gap for ignition of the spark gap when this voltage amounts to a pre-determined value. The spark gaps are primarily intended to be utilized for overvoltage protection of series capacitors.

10 Claims, 3 Drawing Sheets

4,860,156

OVERVOLTAGE PROTECTIVE CIRCUIT

TECHNICAL FIELD

The present invention relates to an overvoltage protective circuit for an electric device or equipment, for example a series capacitor in a high-voltage network. The circuit comprises a spark gap chain which is connected in parallel with the device or the equipment and which has at least two series-connected spark gaps, at least one of which being provided with at least one trigger electrode, as well as a trigger circuit adapted for ignition of the spark gaps. The trigger circuit comprises a resistor chain which is connected in parallel with the spark gap chain and consists of at least two series-connected resistor groups, as well as at least one transverse connection arranged between the two chains, through which each spark gap is connected in parallel with a respective one of the resistor groups.

BACKGROUND ART

A protective circuit of the above-mentioned kind is previously known from Swedish patent publication No. 358 509. In this circuit a special trigger circuit with auxiliary spark gaps, of the kind which is included in older surge arresters with silicon carbide varistors, is used. Since modern surge arresters are built up of zinc oxide varistors without series-connected spark gaps, the need of these spark gaps has been considerably reduced. This has led to a situation in which there is no longer any market base for a rational manufacture of such gaps. Therefore, also in protective devices of the kind to which the present invention relates, the aim is to avoid using auxiliry spark gaps.

SUMMARY OF THE INVENTION

The object of the present invention is to bring about a protective circuit of the above-mentioned kind, which is relatively simple and reliable and in which the triggering of the protective spark gaps take place directly without the use of auxiliary spark gaps. The device is to be designed such that the spark gaps are ignited with great accuracy, better than or equal to ±4%, when a certain pre-set voltage level has been reached. This is achieved according to the invention by a protective circuit in which at least that one of said resistor groups which is parallel-connected to said spark gap provided with a trigger electrode comprises at least two series-connected resistors, one of which is a linear trigger connected resistor and the other is a voltage-dependent resistor built up of metal oxide varistors, said trigger electrode of the spark gap being adapted to be supplied with the voltage prevailing across the linear trigger resistor for ignition of the spark gap when this voltage amounts to a pre-determined value.

BRIEF DESCRIPTION OF THE DRAWING

The invention will be explained in greater detail, by describing a number of embodiments, with reference to the accompanying drawing, wherein.

DESCRIPTION OF THE PREFERRED EMBODIMENTS

Figure 1:
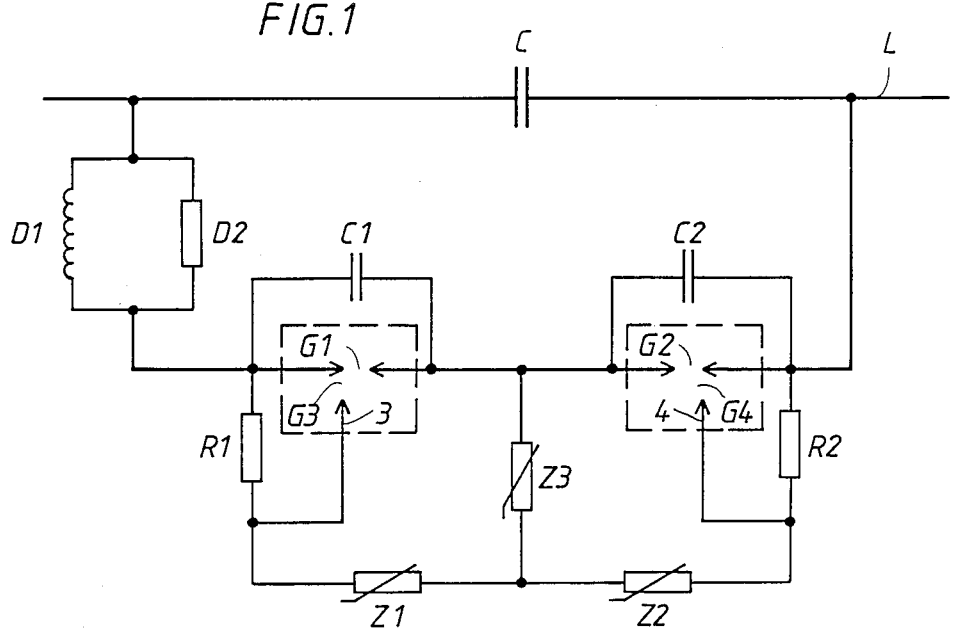
FIG. 1 shows a protective circuit designed according to the invention and utilized for overvoltage protection of a series capacitor.

FIG. 1 shows a protective circuit for a series capacitor bank C connected into a high voltage line L. A chain of spark gaps, consisting of two series-connected spark gaps G1 and G2, is connected in parallel with the capacitor bank to protect it against dangerous overvoltages which may occur, for example in the case of a short-circuit on the high voltage line. The voltage division between the spark gaps G1, G2 is effected with the aid of a control capacitor C1, C2. Spark gaps of this kind are often enclosed within a metallic casing, in which the connection to one of the spark gap electrodes is performed via a capacitor bushing. In such cases the necessary voltage division can possibly be obtained through the capacitor bushings without it being necessary to use separate control impedances. Each spark gap is provided with a trigger electrode 3 and 4, respectively, with one of the main electrodes in a respective spark gap, forms an ignition gap G3 and G4, respectively.

In series with the spark gap chain G1, G2, a damping circuit D1, D2 is arranged to limit the amplitude of the capacitor voltage when the spark gaps are ignited. Also, in a manner known per se, a by-pass circuit breaker may be connected in parallel with the spark gap chain, which by-pass circuit breaker is closed a certain time after the spark gaps have been ignited, the gaps thus being protected against overload.

For triggering the spark gaps, a resistor chain, consisting of two series-connected resistor groups, is connected in parallel with the spark gap chain G1, G2. Each one of the resistor groups comprises two series-connected resistors, one of which being a linear resistor R1 and R2, respectively, and the other being a voltage-dependent resistor Z1 and Z2, respectively, built up of zinc oxide varistors. A transverse connection comprising a zinc oxide resistor Z3 is arranged from a point between the two resistor groups R1, Z1 and R2, Z2, respectively, to a point between the two spark gaps G1, G2.

When the normal operating voltage prevails across the spark gaps G1, G2, a very low current (smaller than 1 mA) passes through the resistors Z1-Z3, which are built up of zinc oxide blocks. The voltage across the linear resistors R1 and R2, which are connected in parallel with the ignition gaps G3 and G4, respectively, is then very low (the resistance for R1 and R2, respectively, is of the order of magnitude of 1 kΩ). The zinc oxide part of the resistor chain is constructed in such a way that its knee voltage is approximately equal to the desired firing voltage for the spark gap chain. The sharp increase in current which is obtained through the resistor chain, when the voltage across the capacitor C exceeds the knee voltage of the zinc oxide blocks, causes the voltage to increase rapidly across the linear resistors R1 and R2, the ignition gaps G3 and G4 firing and initiating ignition of the main gaps G1 and G2.

FIGS. 2-6 show different variants of the protective circuit according to the invention. However, for simplicity, these figures do not include the series capacitor C and the damping circuit D1, D2.

Figure 2:
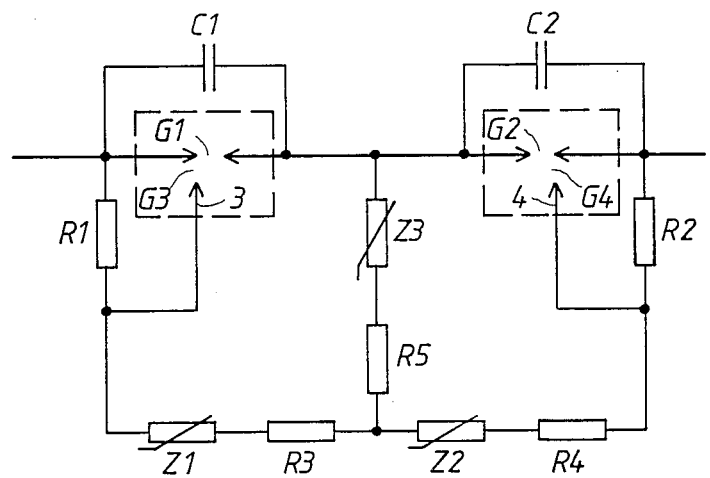
FIGS. 2-6 show various modifications of the protective circuit.

In the variant shown in FIG. 2, the linear resistors R3, R4 and R5 have been connected in series with the zinc oxide resistors Z1, Z2 and Z3, respectively, to limit the current when the ignition gaps G3 and G4 have fired. The resistance for these current limiting resistors R3, R4 and R5 should be less than for the trigger resistors R1 and R2 and may suitably be between 10 and 300Ω. Otherwise, the protective circuit according to FIG. 2 operates in the same way as that shown in FIG. 1.

Figure 3:
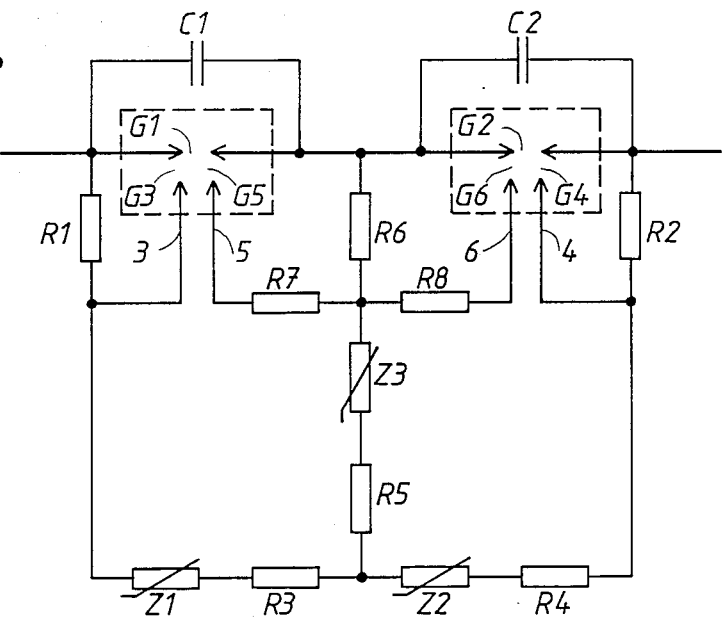

FIG. 3 shows a third embodiment of the invention, in which each one of the spark gaps G1 and G2 is provided with an additional trigger electrode 5 and 6, respectively, to increase the reliability. Together with the second main electrode, the trigger electrodes 5, 6 form, in the respective spark gaps G1, G2, a second ignition gap G5 and G6, respectively, which is supplied with the voltage across a linear trigger resistor R6 which is common to these ignition gaps and located in the transverse connection between the resistor chain and the spark gap chain. Current limiting resistors R7 and R8, respectively, are connected into the line connections to the trigger electrodes for protection of the trigger electrodes.

Figure 4:
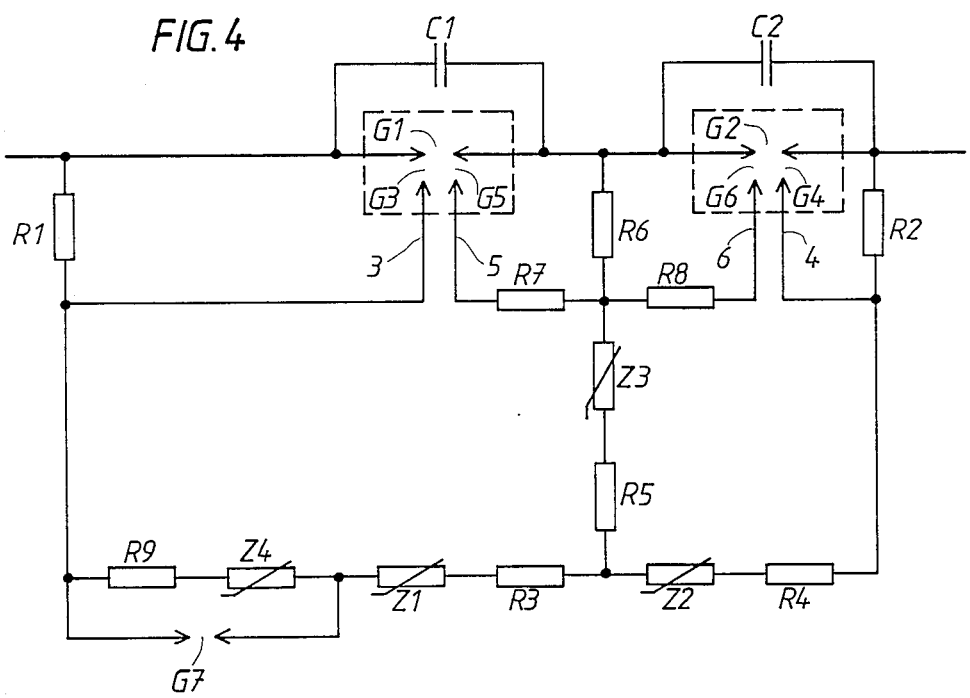

FIG. 4 shows a further variant of the invention in which part of the resistor chain, consisting of a linear resistor R9 connected in series with a voltage-depending resistor Z4, is provided with a by-pass member which in the embodiment shown consists of a spark gap G7. Instead of this spark gap it is possible to use a self-igniting thyristor or any other member which functions in a similar manner. The resistance of the resistor R9 is chosen greater than the resistance of R1 and R2, respectively.

The device according to FIG. 4 operates as follows: If a dangerous overvoltage arises across the capacitor C and the current through the resistor chain increases, the voltage increases proportionally more across the resistor R9, and the spark gap G7 is ignited. The voltage jump is moved to resistors R1 and R2, whereby the ignition gaps G3 and G4 are ignited and initiate the ignition of the main spark gaps G1 and G2. The protective circuit according to FIG. 4 can be used for lower voltages than the other circuits shown (for example, for a firing voltage of 100 kV) and provides a smaller spread of the ignition value.

Figure 5:
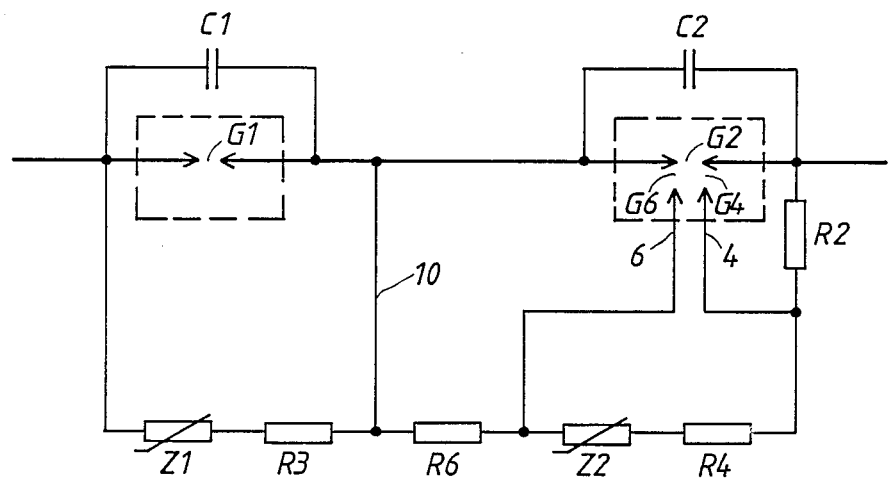

In the embodiment shown in FIG. 5, the spark gap chain consists of a first protective spark gap G1 without trigger electrodes and a second protective spark gap G2 with two trigger electrodes 4, 6. Together with the main electrodes of the spark gap, the trigger electrodes form two ignition gaps G4, G6, which are each supplied with the voltage across a respective trigger resistor R2 and R6, respectively, which are arranged in that part of the resistor chain which is connected in parallel with the protective spark gap G2. In the embodiment shown, a direct transverse connection 10 is arranged without a resistor between the spark gap chain and the resistor chain. By using two trigger electrodes in the same gap, a greater trigger effect is achieved and thereby a more reliable firing of the protective spark gap with a relatively large electrode distance. When the spark gap G2 has been triggered, a voltage growth across the gap G1 is obtained (approaching a doubling) and also this gap is ignited.

The task of the resistor R3 in FIG. 5 is to limit the current when the spark gap G2 has been ignited. In practice, the resistance of the resistor R4 may be zero.

Figure 6:
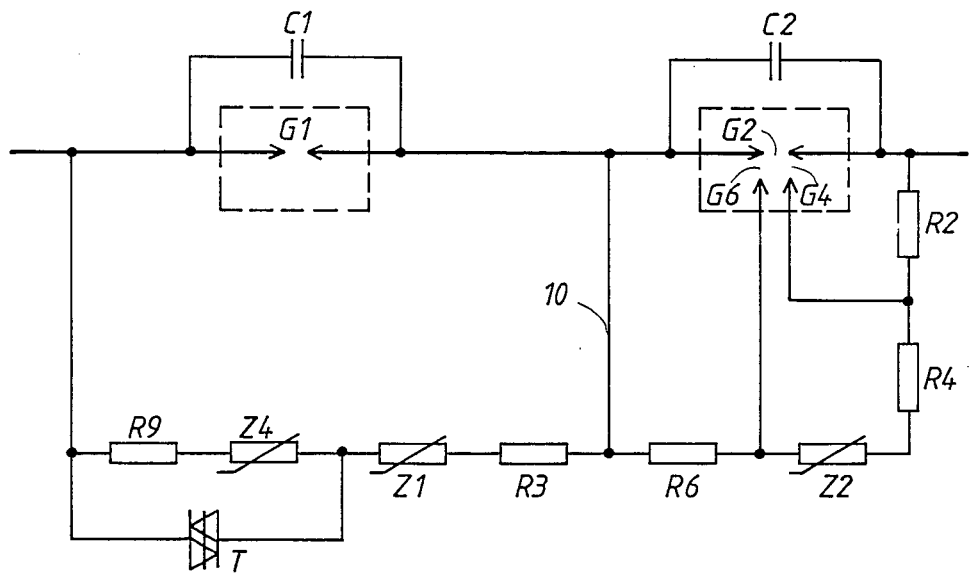

The embodiment shown in FIG. 6 differs from that shown in FIG. 5 by the parallel circuit to the protective spark gap G1 contaning two series-connected resistors R9, Z4 provided with a by-pass member in the form of a self-igniting thyristor or, alternatively a spark gap G7 with the same function as the spark gap G7 in the embodiment according to FIG. 4.

The invention is not limited to the embodiments shown but several variants are possible within the scope of the claims. For example, the triggering arrangement proposed can be utilized also when the spark gap chain comprises more than two series-connected spark gaps.

We claim:

1. A circuit for overvoltage protection of an electric device (C), said circuit comprising a spark gap chain, connected in parallel with said electric device and having at least two series-connected protective spark gaps (G1, G2), at least one of which (G2) being provided with at least one trigger electrode (4), as well as a trigger circuit adapted for ignition of the spark gaps, said trigger circuit comprising a resistor chain connected in parallel with the spark gap chain and consisting of at least two series-connected resistor groups (Z1 and R2, Z2) and at least one transverse connection arranged between the two chains, each of the protective spark gaps being connected in parallel with a respective one of said resistor groups through said transverse connection, at least that one of said resistor groups which is parallel-connected to said spark gap (G2) provided with a trigger electrode comprises at least two series-connected resistors, one of which being a linear trigger resistor (R2) and the other a voltage-dependent resistor (Z2) built up of metal oxide varistors, said trigger electrode (4) of the spark gap being adapted to be supplied with the voltage prevailing across the linear trigger resistor for ignition of the spark gap when this voltage amounts to a pre-determined value.

2. A circuit according to claim 1, in which both protective spark gaps (G1, G2) are provided with trigger electrodes (3, 4), which are adapted to be supplied with the voltage prevailing across a linear trigger resistor (R1 and R2, respectively) in the parallel circuit of the respective spark gap.

3. A circuit according to claim 2, in which the trigger resistors (R1, R2) are arranged at the ends of the resistor chain and connected between a main electrode and a trigger electrode (3, 4) in a respective one of the spark gaps (G1, G2).

4. A circuit according to claim 1, in which said transverse connection comprises a voltage-dependent resistor (Z3).

5. A circuit according to claim 1, in which the voltage-dependent resistors (Z1, Z2, Z3) are connected in series with linear current limiting resistors (R3, R4, R5).

6. A circuit according to claim 1, in which at least one of the spark gaps (e.g. G2) has a second trigger electrode (6), which is adapted to be supplied with the voltage that prevails across a second linear trigger resistor (R6) arranged in the parallel circuit of the spark gap (G2).

7. A circuit according to claim 6, in which a linear current limiting resistor (R8) is arranged in the transverse connection to said second trigger electrode (6).

8. A circuit according to claim 1, in which one of the resistor groups comprises a resistor means connected in series with the voltage-dependent resistor (Z1) of the group, said resistor means comprising a linear resistor (R9) and being connected in parallel with a by-pass member which is adapted to become activated when the voltage across the resistor means exceeds a certain value.

9. A circuit according to claim 8, in which the by-pass member consists of a spark gap (G7).

10. A circuit according to claim 8, in which the by-pass member consists of a self-igniting thyristor.

* * * * *